Figure 15:
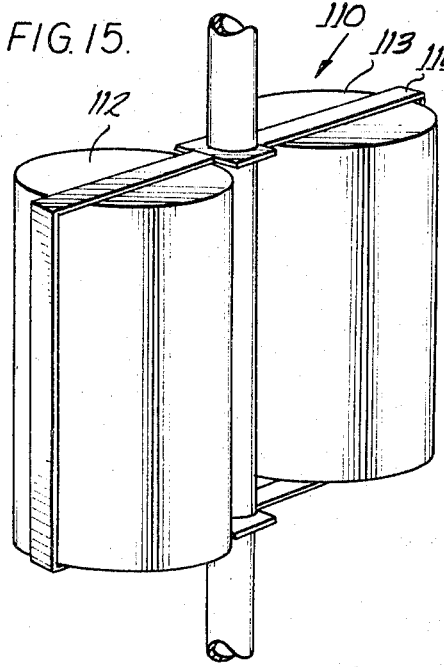

May 7, 1968  F. DRUECK, JR  3,381,399
BATTERY OPERATED OUTDOOR DISPLAY
Filed July 15, 1966  3 Sheets-Sheet 1
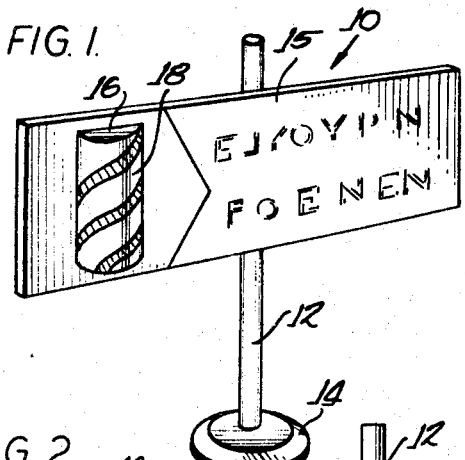
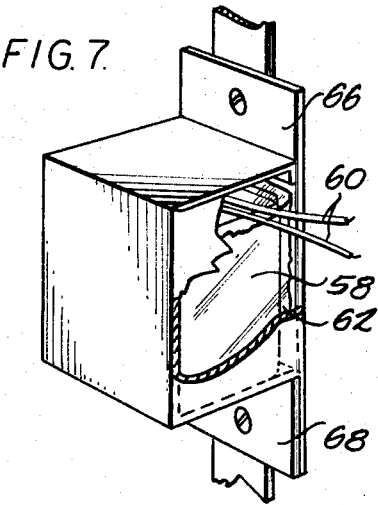
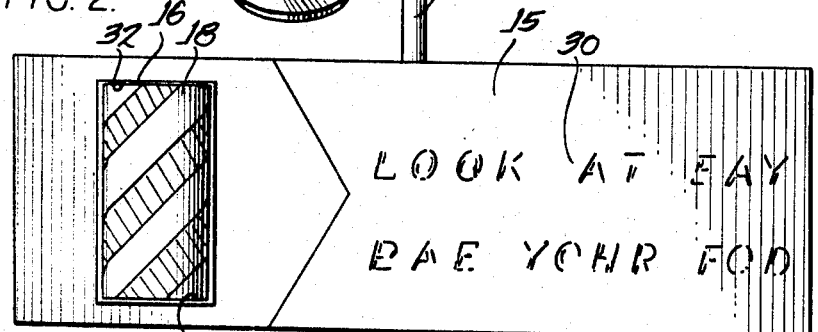
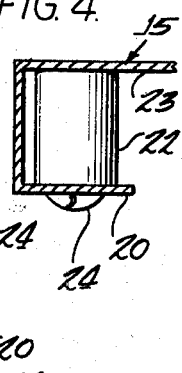
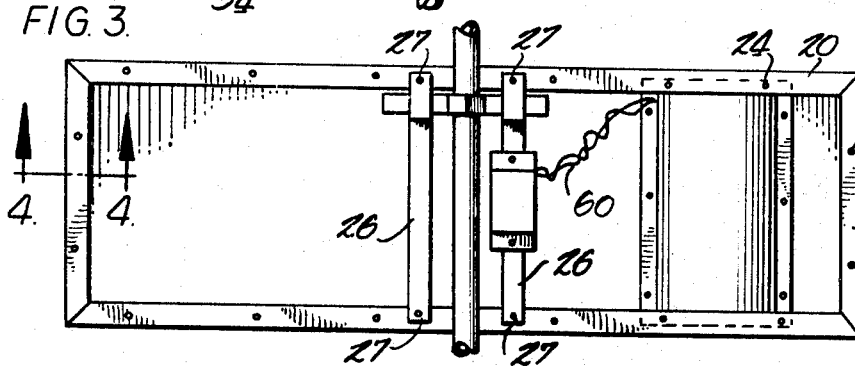
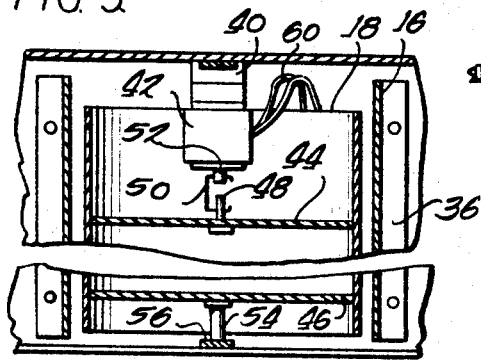
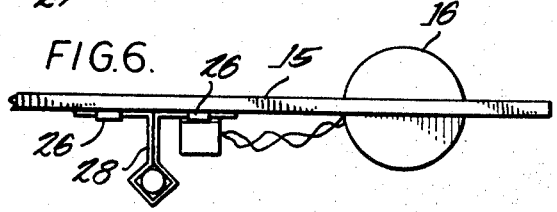
Inventor
Fred Drueck, Jr.
Dominik, Stein & Knechtel
Atty's

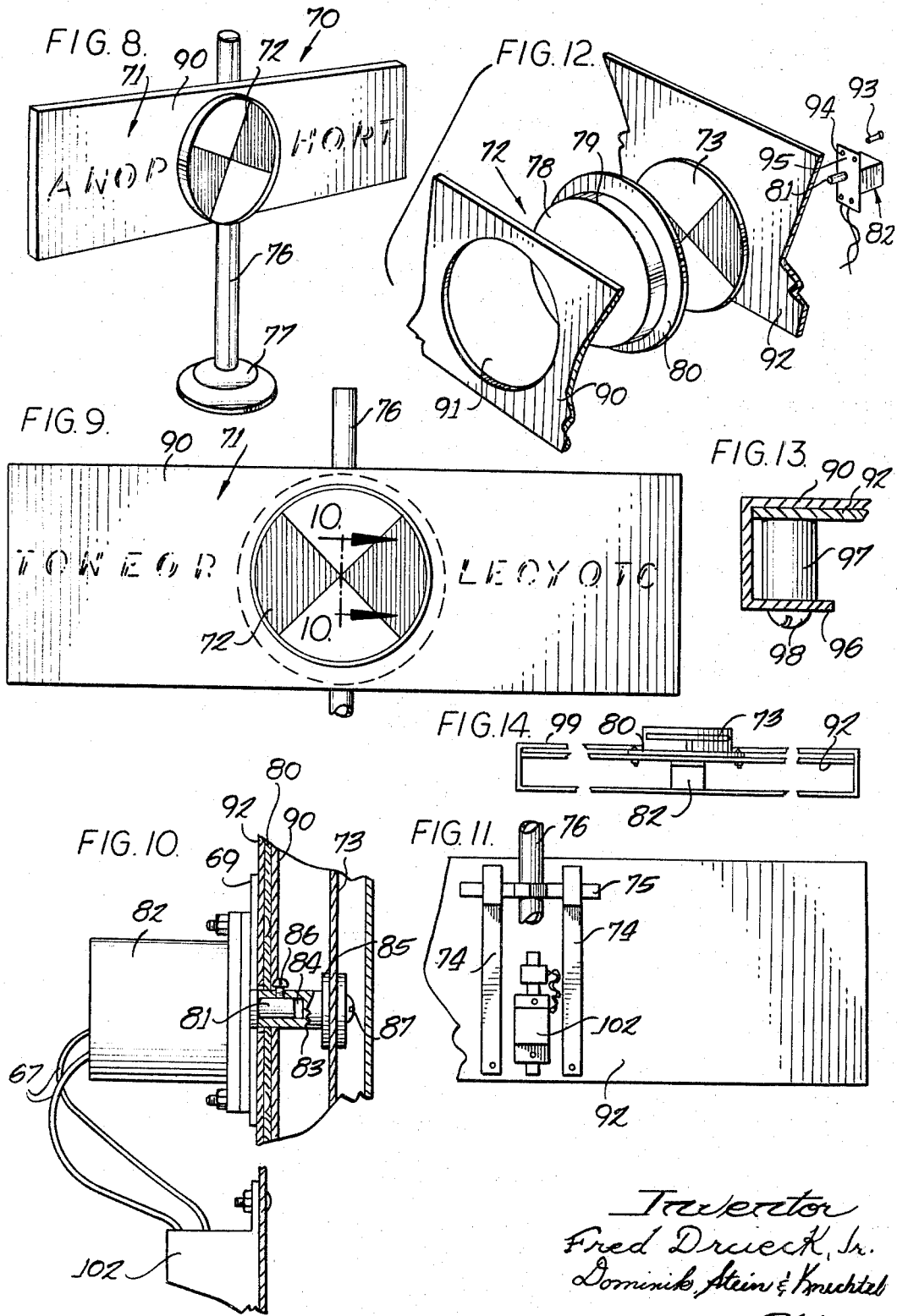

May 7, 1968  F. DRUECK, JR  3,381,399
BATTERY OPERATED OUTDOOR DISPLAY
Filed July 15, 1966  3 Sheets-Sheet 3

Inventor
Fred Drueck, Jr.
Dominik, Stein & Knechtel
Atty's

United States Patent Office 3,381,399
Patented May 7, 1968

3,381,399
BATTERY OPERATED OUTDOOR DISPLAY
Fred Drueck, Jr., 4941 W. Henderson St.,
Chicago, Ill. 60641
Filed July 15, 1966, Ser. No. 565,590
15 Claims. (Cl. 40—33)

This invention relates to displays and, in particular, to displays which are adapted for outdoor use and which have some part or parts thereof adapted for movement with respect to the remaining part of them, for the purpose of attracting attention.

Many displays of the above type for outdoor use are available, however, the majority of them are extremely limited in application. This is due in part to the fact that they are electrically powered by plugging them into the conventional 110 volt outlets generally found in the home or office. Accordingly, the displays must be positioned convenient to the electrical outlets, or extension cords and the like used. The electrical wires are generally difficult to conceal to prevent them from detracting from the display and, in most cases, they are generally undesirable because they are subject to being intentionally or accidentally unplugged, thereby rendering the display inoperative.

Also, since the displays are electrically operated from a 110 volt source, the displays usually must conform to the electrical and safety codes of cities and villages, otherwise they are prohibited. Inasmuch as these codes generally vary considerably from one city to another, it is difficult to standardize a design. Displays operated from a 110 volt source usually cannot be used in gasoline stations, particularly in close proximity to the gasoline pumps, because of the inherent danger of short-circuits or arcing which may ignite the gasoline fumes. If displays of this type are used, they usually must conform to a rigid safety code and, accordingly, the cost of the displays is substantially increased, because of the additional safety equipment required.

The electrical apparatus and the connections thereto of the displays of the latter type must also be well insulated, otherwise there is considerable danger of fire from short-circuits and the like, due to rain or snow.

The displays of the present invention are operated from a source of stored power such as a battery or power pack and hence, many of the objectionable features set forth above are eliminated. Accordingly, the displays are extremely versatile in that they can be used almost any place and, in particular, in gasoline stations. There is little, if any, electrical hazards since only low voltages and currents are involved in their operation and, for the same reasons, they are not subject to most city and village codes. The insulating and hermetic sealing of the batteries, power packs, electrical apparatus and the like is accomplished in a simple fashion so that the cost of manufacturing the displays can be substantially reduced. The design of the displays also are such that they may be easily and quickly modified and adapted to a whole host of different configurations, for an infinite variety of applications.

It is therefore an object of the present invention to provide improved displays which are adapted for outdoor use and which have some part or parts thereof adapted for movement with respect to the remaining part of them, for the purpose of attracting attention.

Another object is to provide improved displays of the above type which are formed as integral units in the sense that the displays include and are operated from a source of stored power such as a battery or power pack.

Another object is to provide improved displays of the above type which are designed in a fashion such that they may easily and quickly be modified and adapted to a whole host of different configurations.

Still another object is to provide improved displays which are adaptable to an infinite variety of applications.

A still further object is to provide improved displays of the described type which are relatively inexpensive to manufacture in comparison to similar existing displays. In this respect, it is further contemplated that the displays can be easily and quickly assembled, in both the place of manufacture and at the point of use, without the need of special tools and the like, and by laymen.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view of a display exemplary of a first embodiment of the invention;
FIG. 2 is a front plan view of the display of FIG. 1;
FIG. 3 is a rear plan view of the display of FIG. 1;
FIG. 4 is a sectional view taken along lines 4—4 of FIG. 3;
FIG. 5 is a partial view of the display of FIG. 1, sectionalized to illustrate the construction of the transparent bubble portion thereof and the cylindrical rotating member therein;
FIG. 6 is a partial top plan view of the display of FIG. 1;
FIG. 7 is a view illustrating the manner in which the source of power for the display of FIG. 1 is affixed to the display and is insulated from the weather;
FIG. 8 is a plan view of a display exemplary of a second embodiment of the invention;
FIG. 9 is a front plan view of the display of FIG. 8;
FIG. 10 is a partial view of the display of FIG. 1, illustrating the manner in which the motor is drivingly affixed to the disc within the bubble portion thereof;
FIG. 11 is a partial rear plan view of the display of FIG. 8;
FIG. 12 is a partial exploded view of the display of FIG. 8, illustrating the manner in which the bubble portion thereof is assembled therein;
FIG. 13 is a sectional view like FIG. 4, taken approximately at the same position, to illustrate the construction of the body portion of the display;
FIG. 14 is a sectional view taken transversely along the longitudinal axis of the display, illustrating an alternative construction thereof; and
FIGS. 15–19 are views illustrating displays constructed using the basic construction principles of the displays of FIGS. 1 and 8.

Referring now to the drawings, in FIG. 1 there is shown a display 10 exemplary of an embodiment of the invention which display is adapted for mounting upon a pole 12 which is vertically supported by means of a support base 14. The display includes a main body portion 15 which may be rectangular in shape, as illustrated, or any one of a number of different configurations, some of which are illustrated in the drawings and described below. A transparent bubble 16 is affixed to the body portion 15 and has a hollow cylindrical tube 18 rotatably mounted therein, for the purpose of attracting attention. The bubble 16 and the tube 18 also may assume any one of a number of different configurations, to adapt the display 10 for a partitcular purpose, as described more fully below.

The body portion 15 is preferably fabricated from cardboard or plastic, however, it can also be fabricated from pressboard, wood or metal. If fabricated of cardboard, the cardboard is preferably coated with a weather resistant material, or painted, or both coated and painted. Substantial rigidity is afforded to the body portion by reversely folding its edge about its entire periphery so as to provide a flange 20 on the back side of the display. Spacers 22 are preferably fixedly secured between the flange 20 and the backside of the front wall 23 of the body portion 15 by means of fasteners such as the threaded screws 24, to retain the flanges in fixed position to provide greater rigidity. A pair of vertically disposed bracket supports 26 are fixedly secured to the body portion 15 with fastener means such as threaded screws 27 extended through the bracket supports and the flange 20. A bracket 28 which in the illustrated case is a bracket which is adapted to clamp about the pole 12 is fixedly secured to the bracket supports 26. Appropriate advertising or display material 30 is provided on the face of the body portion 15.

The transparent bubble 16 is preferably fabricated in two sections, each of which is semi-cylindrical in shape and has a top wall 32, a bottom wall 34 and an outwardly disposed flange 36 about its entire periphery. A rectangular shaped aperture which corresponds in size to the radius of the bubble 16 is formed in the body portion 15 so that one section of the bubble can be extended through the aperture, with the flange 36 formed about its periphery engaged against the backside of the front wall 23 of body portion 15. The remaining half of the bubble 16 is affixed to the other half and the entire bubble is fixedly secured to the body portion 15 with fastener means, such as the threaded screws 38 extended through the front wall 23 and the flanges 36 of the bubble 16. A gasket or sealing material of some sort (not shown) is preferably fixedly secured between the flanges 36 of the two halves of the bubble 16 to effectively hermetically seal the interior of the bubble 16.

A motor retaining bracket 40 is affixed to the body portion 15 between the flange 20 and the front wall 23 of the body portion, in a position so as to be substantially vertically disposed along the vertical axis of the bubble 16. The motor retaining bracket 40 is extended into the bubble 16 between the flanges 36 formed on each of its two halves, and accordingly, insulating material of some sort is preferably affixed to the motor retaining bracket 40 along the portion thereof engaged by the flanges 36, to provide a water-tight seal. The motor retaining bracket 40, however, is positioned substantially between the flange 20 and the front wall 23 of the body portion 15 and is therefore substantially concealed so that there is little likelihood of leakage at this point, whether the insulating material is provided or not.

A motor 42 is fixedly secured to the motor retaining bracket 40 and extends within the interior of the hollow cylindrical tube 18. The tube 18 has a top wall 44 and a bottom wall 46 which are recessed within the interior of the tube 18. A pin 48 is fixedly secured at the center point of the circular top wall 44 and has an aperture (not shown) formed in it for receiving one leg of an U-shaped coupler 50. The opposite leg of the U-shape coupler 50 is affixed to the output shaft 52 of the motor 42. A similar pin 54 is fixedly secured to the bottom wall 46 of the tube 18 and its end is retained within a bearing 56 in the form of a flat washer or the like, to rotatably mount the tube 18 within the bubble 16. It is apparent, however, that a single shaft or axle could be substituted for the pins 48 and 54, which shaft would extend through the center of the cylindrical tube 18, to rotatably mount the tube 18 in the described manner.

The motor 42 is preferably a D-C motor and it is preferably energized by means of a source of stored power 58 (FIG. 7) such as a six volt battery or power pack. The source of power 58 is coupled to the motor 42 by means of a pair of conductors 60. The source of power 58 is easily and conveniently hermetically sealed from the weather by placing it within a plastic bag 62, and by placing the source of power 58 and the plastic bag 62 within a closable box 64 affixed to one of the bracket supports 26. The box 64 may be of closed construction with a back wall 66 which extends above and below the top and bottom walls thereof so as to form a flange for affixing the box to the bracket support 26. The bottom wall 68 may also be oversized so that it may be folded to overlap the back wall 66 and affixed to it. With this construction, the source of power 58 can be secured within the plastic bag 62 and then placed within the box 64 through the bottom wall 68 and retained within the box by fixedly securing the folded portion of the bottom wall 68 to the back wall 66. It can therefore be seen that the source of power is inexpensively and easily protected from the weather. Also, there is little danger, if any, that it may be short circuited or the like, by rain or snow. The motor 42 being effectively sealed within the bubble 16 is also protected from the weather and the only electrical portion of the display which is exposed to the weather is the conductors 60. If desired, the conductors 60 could be likewise protected from the weather by enclosing them within a tubular channel or by merely wrapping them with insulating tape or the like. To initiate operation of the revolving tube 18, the conductors are merely affixed to the source of power 58 to energize the motor 42. A switch can be provided in the coupling between the source of power and the motor, for turning the motor ON and OFF, if desired.

In FIGS. 8–12, there is illustrated a display 70 exemplary of another embodiment of the invention having a body portion 71 which, in the illustrated case, is rectangular in shape and a generally circular transparent bubble 72 in which is rotatably mounted a circular disc 73 (FIG. 12). The rectangular body portion 71, as can be best seen in FIG. 11, has a pair of bracket supports 74 affixed to it for a bracket 75 which is adapted to support the display 70 on a pole 76. The pole 76 is vertically supported by means of a support base 77.

The transparent bubble 72, as can be best seen in FIG. 12, is generally circular in configuration and has a top wall 78, a side wall 79 and an outwardly extending flange 80 extending about the periphery of the side wall 79 at its one end.

The front wall 90 of the rectangular body portion 71 of the display 70 has a circular shaped aperture 91 which corresponds to the diameter of the transparent bubble 72 formed in it, and the transparent bubble 72 is affixed to the display 70 by extending the transparent bubble through the aperture 91 to engage the flange 80 about its periphery with the backside of the front wall 90.

A D-C motor 82 is fixedly secured to a back wall 92 by means of fastener mean such as threaded screws 93 extended through apertures 94 formed in a bracket 95 of the motor, with its output shaft 81 extended through an aperture (not shown) formed in the back wall. A flat plate 69 advantageously can be placed between the motor and the back wall, for additional support.

The disc 73 is affixed to the output shaft 81 of the motor 82 by means of a bushing 83. The bushing 83 has an aperture 84 therein for receiving the output shaft 81 and the output shaft is secured therein by means of a threaded tap screw 86 or the like. The disc 73 is affixed to an enlarged head portion 85 of the bushing 83 by means of a threaded screw 87. A washer 88 of substantially the same size as the enlarged head portion 85 is preferably provided between the disc and the screw 87, for additional supporting engagement.

The front wall 90 is formed in the same manner as the front wall 23 of the display 10, that is, its peripheral edge is reversely folded to form a flange 96. Accordingly, to assemble the display 70, the back wall 92 is abutted against and affixed to the backside of the front wall 90 by means of spacers 97 disposed and fixedly retained between the flange 96 and the back wall 92 by means of fastener means such as the threaded screws 98.

An alternative construction is to form the rectangular body portion 71 of the display 70 as two hollow members 99 and 100 which are adapted to slidably receive the back wall 92 therein to assemble the display 70. In such a case, the transparent bubble 72 can be fixedly secured to the back wall 92 by means of fastener means such as threaded screws extended through the flange 80 thereon and the back wall 92. The hollow members 99 and 100 each have semi-circular cutouts therein which are adapted to abut against the side wall 79 of the transparent bubble, when the display is assembled.

The source of power for the motor 82 is sealed within a box 102 in the same fashion as the source of power 58 is secured within the box 64 described above. The box 102 may be fixedly secured to one of the bracket supports 74, or to the back wall 92 as illustrated in FIG. 11. The source of power is coupled to the motor 82 by means of the conductors 67. A switch can be provided to turn the motor ON and OFF, if desired.

Appropriate advertising material and the like can be provided on the body portions of the displays, and additional advertising material or "eye-catching" indicia or designs provided on the rotating cylindrical member or disc of the respective displays, to attract attention to the body portion, which may contain the major or important message to be conveyed, or simply to the rotating cylindrical member or disc itself.

The body portions of the displays can be fabricated of a transparent plastic material and lightweight cardboard or paper inserts upon which the advertising material is printed provided and adapted to be secured within them. In this fashion, a substantially permanent display which is readily adaptable to display different messages can be easily and inexpensively provided. Also, by varying the size an/or confiuration of the body portions of the displays, numerous different displays for a whole host of applications can be provided. Several displays representative of those which may be constructed are illustrated in FIGS. 15–19.

In each of the two embodiments described above, it can be seen that the displays can be easily, quickly and inexpensively manufactured. Also, by appropriating the design characteristics of the display, numerous different displays can be constructed, as described more fully below. The displays are extremely versatile and can be used in a virtually unlimited number of applications and/or locations. This latter factor is due to the fact that the displays have their own self-contained power supplies and therefore need not be placed conveniently to existing electrical outlets. The power supplies and electric motors are low voltage devices, hence the electrical insulation and safety precautions which must be provided are substantially reduced in comparison to that required with the electrically powered outdoor displays of the prior art.

In FIG. 15, there is illustrated a display 110 having two transparent bubbles 112 and 113 each of which is the same as or similar to the transparent bubble 16 of the display 10. The rotating members (not shown) within each of the transparent bubbles 112 and 113 can be adapted to rotate in the same, or opposite directions so as to provide an attractive eye-catching display. Also, as illustrated, the rectangular body portion 114 of the display 110 can be substantially reduced in size, in comparison to the rectangular body portions 15 and 71 of the displays described above. A display of this type can be used on existing poles in gas stations, used car lots, supermarket parking lots and the like. It is apparent that the transparent bubbles 112 and 113 can be replaced with circular transparent bubbles like the transparent bubble 72 to provide a display having multiple rotating discs.

Figure 16:
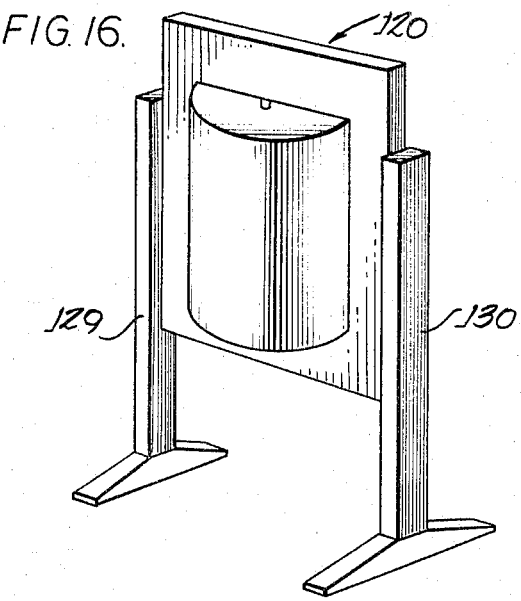

The displays 10 and 70 also can be adapted for use with existing or custom-made curb signs. In FIG. 16 a display 120 which substantially corresponds to a reduced-in-scale display 10 is adapted to a curb sign having a pair of spaced apart support legs 129 and 130, between which the display is supported by means of a pair of pivot pins.

Figure 17:
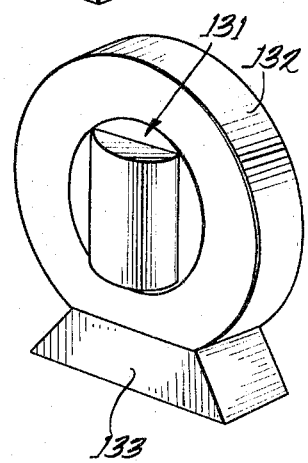

In FIG. 17, a display 131 which is similar to the display 10 is adapted for installation within an automobile tire 132 or the like. The tire is vertically supported by a support stand 133.

Figure 18:
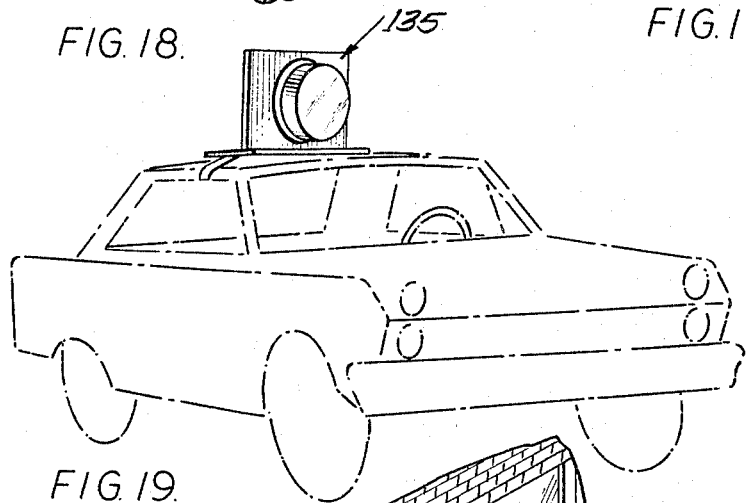
Figure 19:
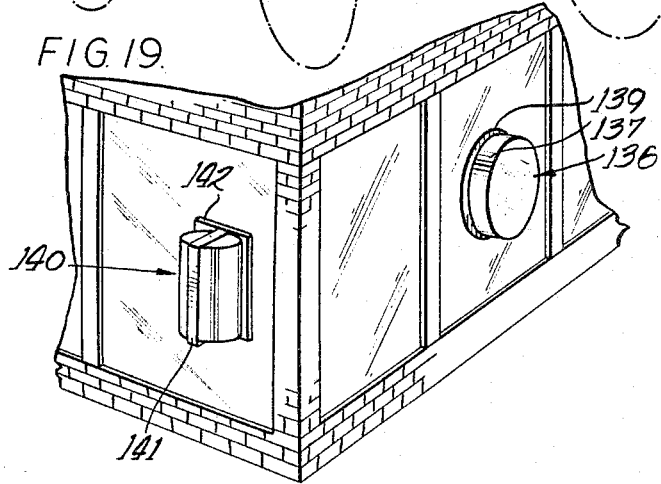

In FIGS. 18 and 19, the illustrated displays 135 and 136 which are similar to the displays 70 are adapted for attachment to the roof of an automobile and to a store window, respectively. The display 136 is modified to receive the motor and the source of power within the interior of the bubble 137, so that the display can be mounted flush against the window. In such a case, the motor and the source of power are affixed to a back wall 139, and the side wall 137 of the bubble is opaqued so that they are concealed therein.

In FIG. 19 a display 140 which is similar to the display 10 is also illustrated affixed to a store window. The body portion 141 of the display is perpendicularly affixed to a support plate 142 which is, in turn, affixed to the window.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A self-contained display adapted for use in positions remote from a source of electrical power comprising, in combination: a body portion having at least one aperture therein and means for mounting said display affixed thereto; a rotating member; an enclosure retained within said aperture and having said rotating member rotatably supported therein; electrical motor means affixed to and adapted to rotate said rotating member; a source of stored power coupled to said motor means for operating it to rotate said rotating means; and insulating means for said stored source of power for insulating it from weather.

2. The display of claim 1 wherein said enclosure is formed of two mating halves which are adapted to be affixed to one another to form a substantially sealed hollow enclosure for said rotating member.

3. The display of claim 1 wherein said enclosure is a hollow cylindrical shaped member formed of two mating halves each of which is substantially semi-circular in shape and having a top wall, a bottom wall and an outwardly extending flange formed about the mating peripheral edges thereof, said halves being affixed to one another and said enclosure retained within said aperture in said body portion by abutting the flange on one of said halves against the edges of said body portion about said aperture and extending fastening means through said body portion and said flanges on both of said halves.

4. The display of claim 3 wherein said enclosure is formed of transparent plastic.

5. The display of claim 3 wherein said rotating member is a hollow cylindrical shaped member substantially corresponding in size to that of said enclosure and has a recessed top and bottom wall therein, and wherein said motor means is affixed to said body portion to depend into said rotating member above the top wall thereof, whereby said motor means is effectively hermetically sealed within said enclosure means.

6. The display of claim 1 wherein said body portion is formed of cardboard and has a rectangular shape, the peripheral edge thereof being reversely folded to provide a flange, a plurality of spacers affixed between said flange and a front wall of said body portion.

7. The display of claim 1 wherein said insulating means for said source of stored power comprises said enclosure.

8. The display of claim 1 wherein said insulating means for said source of stored power comprises a closed box having at least one wall thereof adapted to be opened, a water resistant bag within said box, said source of stored power being secured within said bag.

9. The display of claim 1 wherein said source of stored power comprises a battery.

10. The display of claim 1 wherein said enclosure is circular shaped having a top wall, a side wall and an outwardly extending flange formed about the periphery of one end of said side wall, said enclosure being retained within said body portion by abutting said flange against the edges of said body portion about said aperture and extending fastening means through said body portion and said flange.

11. The display of claim 1 wherein said enclosure is circular shaped having a top wall, a side wall and an outwardly extending flange formed about the periphery of one end of said side wall, and wherein said display further includes a back wall, said enclosure being retained within said body portion by abutting said flange against the edges of said body portion about said aperture and securing said back wall to said body portion with the flange of said enclosure sandwiched between said body portion and said back wall.

12. The display of claim 11 wherein said body portion is formed of cardboard and has a rectangular shape, the peripheral edge thereof being reversely folded to provide a flange, a plurality of spacers affixed between said flange and a front wall of said body portion.

13. The display of claim 12 wherein said back wall substantially corresponds in size to that of said body portion, and wherein said back wall is affixed to said front wall with said flange sandwiched between said back wall and said front wall by means of said spacers.

14. The display of claim 11 wherein said body portion is formed of two hollow rectangular shaped members adapted to be affixed to one another in a fashion so as to retain said back wall within them, a substantially semi-circular shaped cutout in the mating edges of said two hollow members for receiving and retaining said enclosure.

15. The display of claim 11 wherein said rotating member comprises a circular shaped disc having a diameter which substantially corresponds to the diameter of said enclosure.

References Cited

UNITED STATES PATENTS

| | | | |
|---|---|---|---|
| 1,913,150 | 6/1933 | Atwater | 40—33 |
| 1,926,467 | 9/1933 | Vernon | 40—34 |
| 2,039,770 | 5/1936 | Birdsell et al. | 40—33 |
| 2,843,950 | 7/1958 | Reitz | 40—34 |
| 3,031,784 | 5/1962 | Stein | 40—33 XR |

EUGENE R. CAPOZIO, *Primary Examiner.*

W. H. GRIEB, *Examiner.*